1,869,766

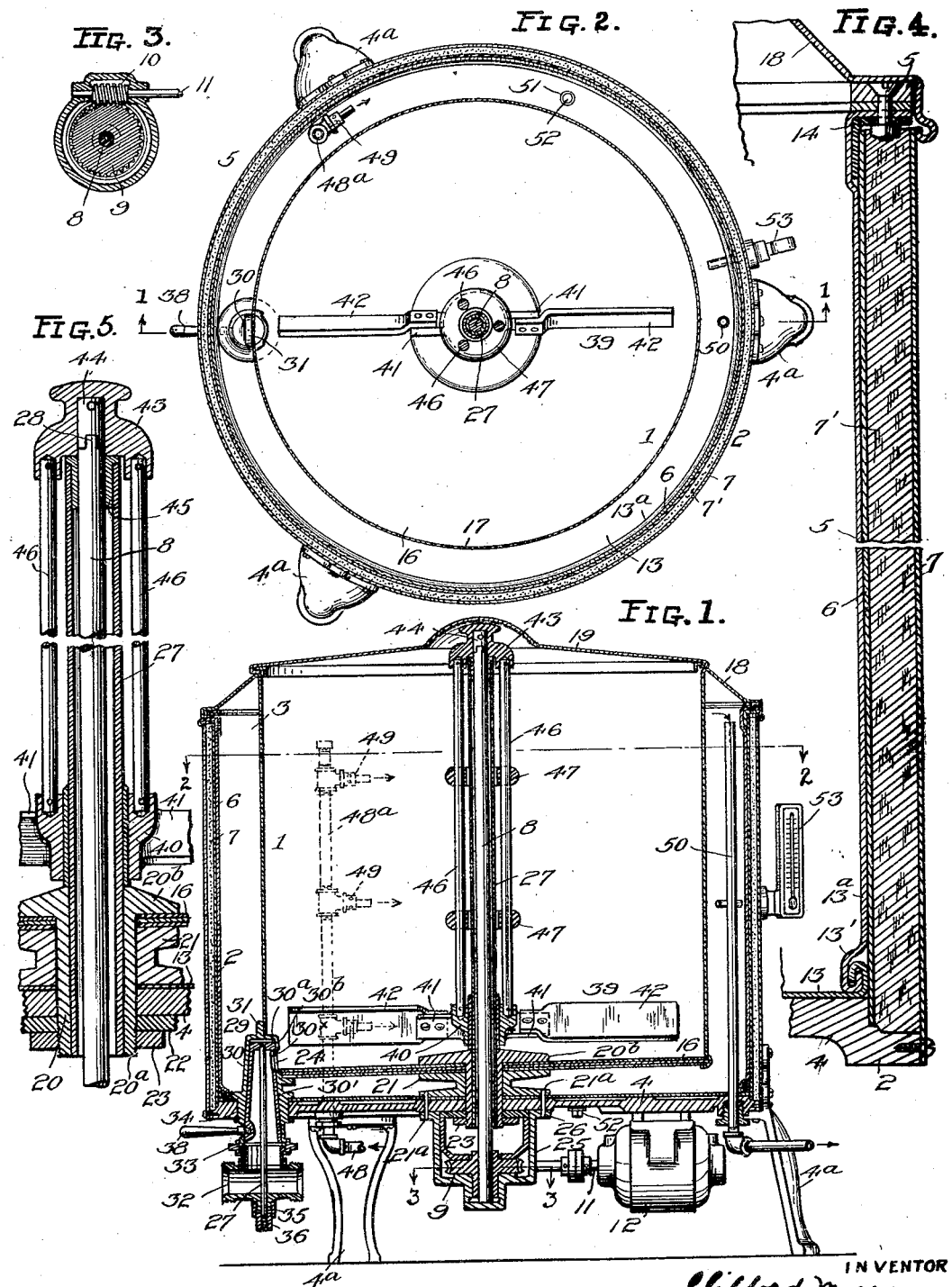
Aug. 2, 1932.     C. MORROW     1,869,766
PASTEURIZER
Filed Nov. 16, 1929
INVENTOR
Clifford Morrow
By Geo. B. Pitts
ATTORNEY Patented Aug. 2, 1932

UNITED STATES PATENT OFFICE

CLIFFORD MORROW, OF CANTON, OHIO, ASSIGNOR TO THE H. H. MILLER INDUSTRIES COMPANY, OF CANTON, OHIO, A CORPORATION OF OHIO

PASTEURIZER

Application filed November 16, 1929. Serial No. 407,751.

This invention relates to apparatus for holding or treating food material, more particularly a liquid, such as milk where heating or cooling thereof is required while it is being stirred or agitated. The apparatus herein shown has been advantageously used for pasteurizing milk.

One object of the invention is to provide in apparatus of this character improved driving means for the agitating device.

Another object of the invention is to provide an improved connection between the power driven shaft and the agitating device, whereby danger of the material escaping onto the driving means or the lubricant for the latter becoming mixed with the material, is entirely eliminated.

Another object of the invention is to provide in a liquid retreating tank having a stirring means, improved under driving mechanism therefor without requiring a stuffing box.

Other objects of the invention will be apparent to those skilled in the art to which my invention relates from the following description taken in connection with the accompanying drawing, wherein Fig. 1 is a sectional view of an apparatus embodying my invention, the section being on the line 1—1 of Fig. 2.

Fig. 2 is a section on the line 2—2 of Fig. 1.

Fig. 3 is a section on the line 3—3 of Fig. 1.

Fig. 4 is a fragmentary section, enlarged, on the line 1—1 of Fig. 2.

Fig. 5 is another fragmentary section, enlarged, on the line 1—1 of Fig. 2.

In the drawing, 1, 2, indicate inner and outer holders, the inner holder, which receives and holds the liquid to be treated, being mounted within the outer holder 2. The outer holder 2 receives and holds the heat exchange medium such as water. The holders 1, 2, are preferably of cylindrical shape. The holders 1, 2, are of a size, with respect to each other, to provide a relatively large space 3 between their sides and bottoms, capable of holding an adequate supply of water. The holder 2 comprises a bottom wall 4 (preferably a suitable casting) mounted on legs 4a and a side wall 5. The side wall consists of spaced inner and outer sheet metal walls 6, 7, between which is provided suitable heat insulating material 7', such as cork. The bottom wall 4 is formed with an opening through its center for a driven shaft 8. The shaft 8 is secured to a worm gear 9, with which meshes a worm 10, fixed to a shaft 11, the latter being driven, preferably by a motor 12. The motor 12 may be fixed to the lower face of the bottom 4. The side wall 5 and bottom 4 are provided with liners 13, 13a, suitably seamed at 13' to provide against leakage. The upper edge of the liner 13 is bent outwardly and clamped between a pair of annular members 14, 15, which are disposed on the upper edge of the side wall 5 to reinforce it.

The inner holder 1 comprises a bottom 16, preferably formed of a plurality of layers of suitable sheet material, and a side wall 17 secured in a liquid tight manner around its lower edge to the periphery of the bottom 16. At its upper end the side wall 17 is preferably provided with an extended annular portion 18, which extends across the space 3 between the holders to form a cover therefor, the free edge of such portion being bent to seat upon and over the annular member 14 and extend over and beyond the joints between the top edge of the wall 5, annular members 14, 15, and liner 13. 19 indicates a cover for the holder 1.

The holder 1 is supported within the holder 2 by male and female elements 20, 21, the latter comprising a collar disposed between the bottoms 4 and 16 with its opening registering with the axial openings therethrough and the former comprising a sleeve 20a having a flange 20b engaging the bottom 16 of the holder, the sleeve 20a extending through the opening in the bottom 16, the opening in the collar 21 and opening in the bottom 4 and also through an opening formed centrally in a plate 22 and threaded at its lower end to take a nut 23 which, when tightened, acts through the sleeve 20a and flange 20b to clamp or secure the bottom 16 to the collar. The collar 21 is preferably cut away around its side wall so that the water may circulate inwardly of its periphery. The collar 21 is rigidly secured to the bottom 4 by rivets or bolts 21a.

24 indicates a discharge port preferably disposed in the side wall 17 adjacent the bottom 16. To effect complete emptying of the holder 1 through the port 24, the bottom 16 is disposed in an incline plane the highest point of which is diametrically opposite to the port 24; the upper face of the collar 21 being inclined relative to its lower face and the flange 20b being similarly inclined relative to the axis of the sleeve 20a, so that the bottom 16 may be supported in an inclined plane to effect drainage through the port 24, while supporting the holder 1 in vertical position with its sides vertical.

25 indicates a gear box preferably shaped to fit the plate 22, so that the latter may be utilized as a guide for the positioning of the box. The upper end of the box 25 is provided with a flange 26 which may be secured to the bottom 4 by the rivets 21a.

27 indicates a tubular member extending through the sleeve 20a and upwardly through the holder 1 to point above the level of the liquid or milk therein. The lower portion of the tubular member 27 may be secured within the sleeve 20a, as by a sweating process. The tubular member 27 forms an enclosing member for the shaft 8 which extends through it, preferably to a point beyond the upper end of the tubular member and carries at its upper end a clutch element 28 for a purpose to be later set forth.

29 indicates as an entirety a valve for controlling the discharge of the milk from the holder 1 through the port 24. The valve comprises a casing 30 and a valve element 30' rotatable therein. The casing is of conical shape and a portion 30a thereof is fitted into a cut-away in the bottom 16 and side 17 of the holder 1, the casing having a flange 31 to which these walls are secured in a liquid tight manner. In this preferred arrangement, the discharge port 24 is formed in the portion 30a and registers with an opening 30x in the valve element 30'. The valve element consists of a hollow conical member closed at its inner end by a wall 30b, its outer end communicating with a conduit 32 removably secured to the outer end of the casing 30 by a coupling 33. The body portion of the casing 30 is rigidly but removably mounted in an opening 34 formed in the bottom 4. Being supported in the bottom 4, the valve casing 30 forms an auxiliary support for the holder 1. In the construction shown, the conduit section 32 connected to the casing 30, consists of a T-member and its outer wall is provided with an internally threaded collar 35 to receive a head or body 36 threaded therein. The body 36 carries a rod 37 which extends through an opening formed in the outer wall of the T-member and engages the wall 30b to hold the valve element 30' in its seat while permitting it to rotate to bring the opening 30x into registry with the port 24 or out of registry therewith. As shown in Fig. 1, the inner end of the rod 37 has bearing in an opening or recess formed in the inner face of the wall 30b. The outer portion of the casing 30 is formed with an elongated slot through which a handle 38 extends, the handle being removably threaded into the side wall of the valve element 30', as shown in Fig. 1. The handle 38 is operated to rotate the valve element from its closed to open position (see Fig. 1) and vice versa.

39 indicates an agitating or stirring device for the liquid. Where the apparatus is to be used for pasteurizing milk the device may be rotated relatively slowly and be arranged near the bottom 16. Where the apparatus is to be used for other purposes the device may be rotated at any desired speed and shaped and constructed to suit the particular purpose in view; for example, a plurality of agitating devices may be provided at different levels, or a vertically disposed revoluble bar may be provided, or a scraper may engage the side and bottom walls or either thereof.

The device 39 shown consists of a hub 40 having diametrically arranged arms 41 and rotatably fitting the tubular member 27 or a bushing thereon, preferably adjacent the flange 20b and blades 42 disposed in inclined planes and arranged to lift the material as it rotates. 43 indicates a cap carrying centrally on its underside a clutch element 44 complementary to and removably fitting the clutch element 28 whereby the cap 43 is rotated by the shaft 8. 45 indicates a sleeve fitting into the upper end of the tubular member 27 and provided with a flange which engages the upper edge of the tubular member 27 to support the sleeve in the member 27. The inner wall of the sleeve serves as a bearing for the shaft 8 and its upper end wall serves as a bearing for the cap 43. 46 indicates a plurality of members rigidly connected at their opposite ends to the cap 43 and hub 40 to rotate the latter. These members 46 comprise rods uniformly spaced about the axis of the shaft 8 and in spaced relation to the tubular member 27, their ends extending into sockets formed in the cap and hub and secured therein in a suitable manner as by pins. By lifting the cap 43 upwardly its clutch element 44 will disengage the clutch element 28 and the rods 46 and agitating device 39 may be removed. The rods 46 are preferably connected intermediate their ends by one or more rings 47, the rings being formed with openings through which the rods 46 extend. The rings and rods are secured together by soldering.

48 indicates a supply pipe leading through the bottom 4 and having a portion 48a extending upwardly into the space 3 between the side walls 5, 17. The pipe 48 may be connected with a water supply when it is necessary to fill the space with water such supply having a suitable cut-off. The pipe 48 is also connected with a valve controlled steam supply conduit, the steam supplied thereby being used to heat and maintain hot the water in the space 3. For this purpose the pipe 48a is provided with a plurality of suitable injectors 49 which effect a mixing of the supplied steam and water to heat the latter. 50 indicates an overflow pipe to permit discharge of the water when its volume increases due to the supplied steam and condensing thereof.

51 indicates a drain opening formed in the bottom 4, this opening being closed by a plug 52. 53 indicates a thermometer which may be mounted in the side wall 5 to indicate the temperature of the heat exchange medium in the space 3.

In my form of construction the tubular member extends to a point above the upper edge of the holder 1, so that the liquid cannot overflow thereinto. If the holder 1 is over filled, the surplus will flow over its inclined periphial edge and be carried outside the holder 2. As the tubular member extends through the bottoms of both holders it will be seen that the milk cannot flow into the driving means and any lubricant used for lubricating the gears cannot find its way into holder 1. It will also be seen that in my construction I eliminate the necessity for a stuffing box, in which bacteria may collect.

In operation, the space 4 is filled with the desired amount of water and live steam is supplied thereto to heat it to the desired temperature, approximately 150° F.; the agitating device is set in operation and milk poured into the holder 1 until it is approximately filled. The milk is retained in the holder 1 until it is brought to a temperature of 143 degrees F. and maintaind at that temperature for thirty minutes. At the end of that period the valve is opened and the milk allowed to discharge into the conduit, which conducts it to a suitable cooler.

To those skilled in the art to which my invention relates many changes in construction and widely differing embodiments and applications of my invention will suggest themselves without departing from the spirit and scope thereof. The description and disclosures herein are purely illustrative and are not intended to be in any sense limiting.

What I claim is:

1. In apparatus of the class described, the combination of inner and outer holders disposed concentrically and forming a space between them for a heat exchange medium, a spacing collar between the bottoms of said holders, said holders being formed with openings registering with the opening through said collar, a tubular member mounted at its lower portion in said collar and extending through the openings in said bottoms and upwardly through said inner holder to a point beyond the level of the liquid when said holder is filled, a shaft extending through said tubular member and carrying at its upper end a driving element, means connected to said shaft below said outer holder, for rotating it, a bearing on said tubular member disposed adjacent the bottom of said inner holder, an agitating device rotatably mounted on said bearing and driving connections between said device and said driving element.

2. In apparatus of the class described, the combination of inner and outer holders disposed concentrically and forming a space between them for a heat exchange medium, a spacing collar between the bottoms of said holders, said holders being formed with openings registering with the opening through said collar, a tubular member mounted at its lower portion in said collar and extending through the openings in said bottoms and upwardly through said inner holder to a point beyond the level of the liquid when said holder is filled, a shaft extending through said tubular member and carrying at its upper end a driving element, means connected to said shaft below said outer holder for rotating it, a bearing on said tubular member within said inner holder and at a point remote from the upper end of said tubular members, an agitating device rotatably mounted on said bearing, and driving connections between said device and said driving element, said connections comprising a cap having an element removably engaging said driving element and a plurality of rods disposed in close proximity to the exterior of said tubular member and connecting said cap and agitating device together.

3. In apparatus of the class described, the combination of inner and outer holders disposed concentrically and forming a space between them for a heat exchange medium, a spacing collar between the bottoms of said holders, said holders being formed with openings registering with the opening through said collar, a tubular member mounted at its lower portion in said collar and extending through the openings in said bottoms and upwardly through said inner holder to a point beyond the level of the liquid when said holder is filled, a shaft extending through said tubular member and carrying at its upper end a driving element, means connected to said shaft below said outer holder for rotating it, an agitating device rotatably mounted on said tubular member within said inner holder, and driving connections between said device and said driving element, and a valve for permitting discharge of the material from said inner holder, said valve comprising a valve element and a casing therefor mounted in the bottom of said outer holder and connected to said inner holder, whereby it serves as a supplemental support for the latter, said casing having a port registering with an opening in the wall of said inner holder.

4. In apparatus of the class described, the combination of inner and outer holders disposed concentrically and forming a space between them for a heat exchange medium, the bottoms of said holders being formed with openings, means for supporting said inner holder on the bottom of said outer holder, said means comprising male and female members, the female member being disposed between the bottoms of said holders in registry with the openings therethrough and said male member extending through said openings and said female member and having at its inner end a flange arranged to engage the bottom of said inner holder, and a nut threaded on the outer end of male member and arranged to clamp its flange against the bottom of said inner holder and secure the latter to said female member.

5. In apparatus of the class described, the combination of inner and outer holders disposed concentrically and forming a space between them for a heat exchange medium, the bottoms of said holders being formed with openings, means for supporting said inner holder on the bottom of said outer holder, said means comprising a hollow male member and a female member, the female member being disposed between the bottoms of said holders in registry with the openings therethrough and said male member extending through said openings and said female member and having at its inner end a flange arranged to engage the bottom of said inner holder, and a nut threaded on the outer end of said male member and arranged to clamp its flange against the bottom of said inner holder and secure the latter to said female member, a tubular member mounted at its lower end in said male member and extending upwardly through said inner holder to a point beyond the level of the liquid when said holder is filled, a shaft extending through said tubular member and carrying at its upper end a driving element, means connected to said shaft below said outer holder for rotating it, an agitating device in said inner holder, and driving connections between said driving element and said device.

6. In apparatus of the class described, the combination of inner and outer holders disposed concentrically and forming a space between them for a heat exchange medium, the bottoms of said holders being formed with openings, means for supporting said inner holder on the bottom of said outer holder, said means comprising a hollow male member and a female member, the female member being disposed between the bottoms of said holders in registry with the openings therethrough and said male member extending through said openings and said female member and having at its inner end a flange arranged to engage the bottom of said inner holder, and a nut threaded on the outer end of male member and arranged to clamp its flange against the bottom of said inner holder and secure the latter to said female member, a tubular member mounted at its lower end in said male member and extending upwardly through said inner holder to a point beyond the level of the liquid when said holder is filled, a shaft extending through said tubular member and carrying at its upper end a driving element, means connected to said shaft below said outer holder for rotating it, an agitating device rotatably mounted on said tubular member in said inner holder, and driving connections between said driving element and said device.

7. In apparatus of the class described, the combination of inner and outer holders disposed concentrically and forming a space between them for a heat exchange medium, the bottoms of said holders being formed with openings, means for supporting said inner holder on the bottom of said outer holder, said means comprising a hollow male member and a female member, the female member being disposed between the bottoms of said holders in registry with the openings therethrough and said male member extending through said openings and said female member and having at its inner end a flange arranged to engage the bottom of said inner holder, and a nut threaded on the outer end of said male member and arranged to clamp its flange against the bottom of said inner holder and secure the latter to said female member, a tubular member mounted at its lower end in said male member and extending upwardly through said inner holder to a point beyond the level of the liquid when said holder is filled, a shaft extending through said tubular member and carrying at its upper end a driving element, means connected to said shaft below said outer holder for rotating it, an agitating device rotatably mounted on said tubular member in said inner holder, and driving connections between said driving element and said device, said driving connections comprising a cap having a complementary element engaging said driving element and rods extending between and connected at their ends to said cap and said device.

8. In apparatus of the class described, the combination of inner and outer holders disposed concentrically and forming a space between them for a heat exchange medium, the bottoms of said holders being formed with openings, means for supporting said inner holder on the bottom of said outer holder, said means comprising a hollow male member and a female member, the female member being disposed between the bottoms of said holders in registry with the openings therethrough and said male member extending through said openings and said female member and having at its inner end a flange arranged to engage the bottom of said inner holder, and a nut threaded on the outer end of male member and arranged to clamp its flange against the bottom of said inner holder and secure the latter to said female member, a tubular member mounted at its lower end in said male member and extending upwardly through said inner holder to a point beyond the level of the liquid when said holder is filled, a shaft extending through said tubular member and carrying at its upper end a driving element, means connected to said shaft below said outer holder for rotating it, an agitating device in said inner holder, driving connections between said driving element and said device, and a discharge valve at one side of said inner holder.

9. In apparatus of the class described, the combination of inner and outer holders disposed concentrically and forming a space between them for a heat exchange medium, the bottoms of said holders being formed with openings, means for supporting said inner holder on the bottom of said outer holder, said means comprising a hollow male member and a female member, the female member being disposed between the bottoms of said holders in registry with the openings therethrough and said male member extending through said openings and said female member and having at its inner end a flange arranged to engage the bottom of said inner holder, and a nut threaded on the outer end of male member and arranged to clamp its flange against the bottom of said inner holder and secure the latter to said female member, a tubular member mounted at its lower end in said male member and extending upwardly through said inner holder to a point beyond the level of the liquid when said holder is filled, a shaft extending through said tubular member and carrying at its upper end a driving element, means connected to said shaft below said outer holder for rotating it, an agitating device in said inner holder, driving connections between said driving element and said device, and a discharge valve at one side of said inner holder, the face of said flange and upper face of said female member being inclined to the horizontal to support the bottom of said inner holder in an inclined plane to effect emptying thereof through said valve.

10. In apparatus of the class described, the combination of inner and outer holders disposed one within the other, said holders having vertical sides and the bottom of said inner holder being inclined from one side to its opposite diametrical side, a collar between the bottoms of said holders, the upper face of said collar being inclined to support the bottom of said inner holder in an incline plane with its side walls vertical, a device engaging the bottom of said inner holder and extending through an opening therein and said collar and an opening in the bottom of said outer holder, means engaging the lower end of said device and acting therethrough to clamp the bottom of said inner holder to said collar.

In testimony whereof, I have hereunto affixed my signature.

CLIFFORD MORROW.